J. D. SHAW.
DIVIDING BEE HIVE.
No. 245,751. Patented Aug. 16, 1881.
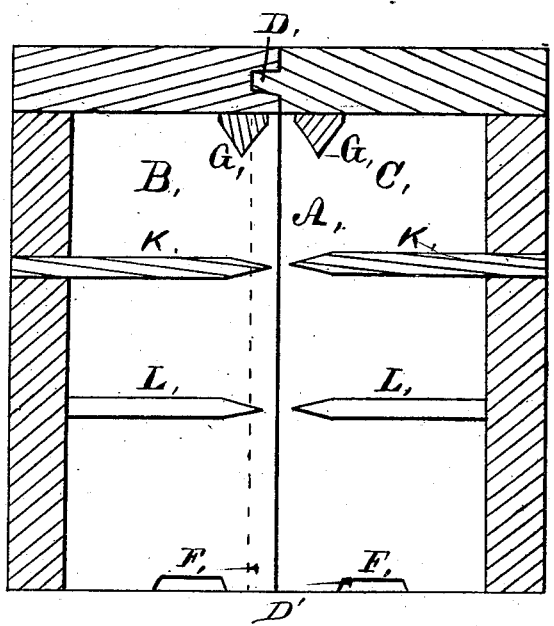
Witness:
A. Holland,
Cha. Ward,
Inventor:
John D. Shaw,
By Saml. P. Wallace,
Attorney.

UNITED STATES PATENT OFFICE.

JOHN D. SHAW, OF WILCOX TOWNSHIP, HANCOCK COUNTY, ILLINOIS.

DIVIDING BEE-HIVE.

SPECIFICATION forming part of Letters Patent No. 245,751, dated August 16, 1881.

Application filed May 7, 1878.

*To all whom it may concern:*

Be it known that I, JOHN D. SHAW, a citizen of the United States, residing in Wilcox township, Hancock county, Illinois, have invented a new and useful Improvement in Dividing Bee-Hives, of which the following is a specification.

This invention relates to an improved hive for bees, having the features shown in the accompanying drawings, in which the figure is a vertical cross-section.

The hive is formed as a box, A, and divided on a vertical central line, D D', into two separable side parts, B C. These parts B C unite with a tongue-and-groove joint up the sides and across the top, and are held securely by latch-hook holders from one to the other. Each part has a depending comb-guide, G, parallel with and on each side of the center joint across the top of chamber A, to cause the bees to build separate combs in each side part, so they may be readily separated apart. Each side half also has pins K L, which project from its side walls toward the line of central division.

The hive being made in separable sections, when it is filled it can be divided and an empty section can be added to each part having comb and bees, so as to form two hives, each having a good start of bees, comb, and honey. This avoids necessity of the bees swarming and the danger of their desertion.

Weak hives can have their bees removed in the fall and be kept till spring with their comb and honey intact to be divided, and each half added to half of a strong hive, instead of adding any empty part, with considerable economy.

The pins K L hold up the comb in place. Their ends are sharpened, so that loose comb can be stuck onto them, in case of starting a new hive, to induce bees to stay and to give them a start, as well as to utilize empty comb.

I claim—

A bee-hive composed of two separable parts or sections, without interior bars or partitions, having pins K L projecting toward the center from its inner walls, and having comb-guides G arranged in relation to the pins substantially as described.

JOHN D. SHAW.

Witnesses:
JAMES M. SHAW,
T. B. DAWSON.